UNITED STATES PATENT OFFICE.

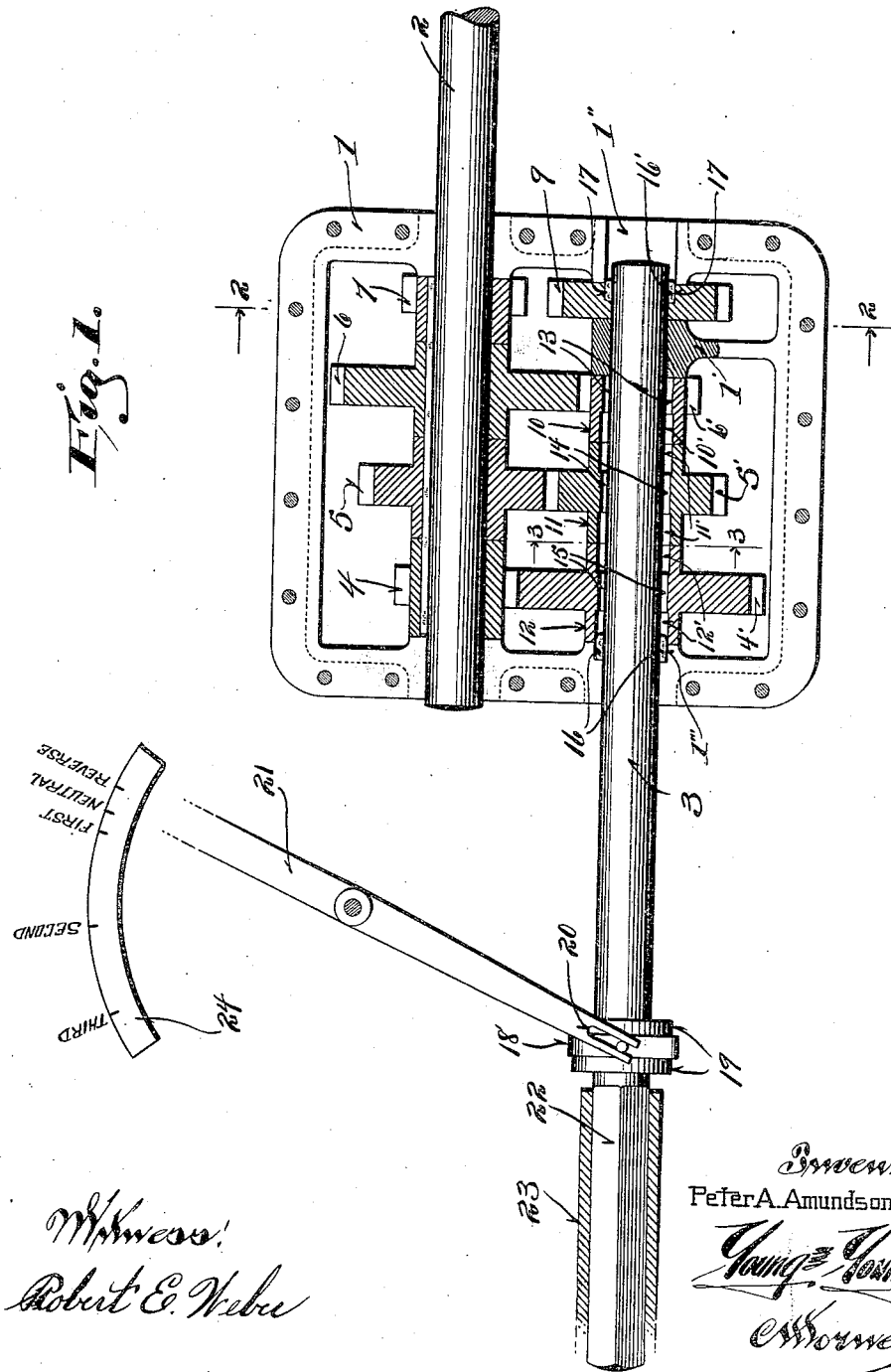

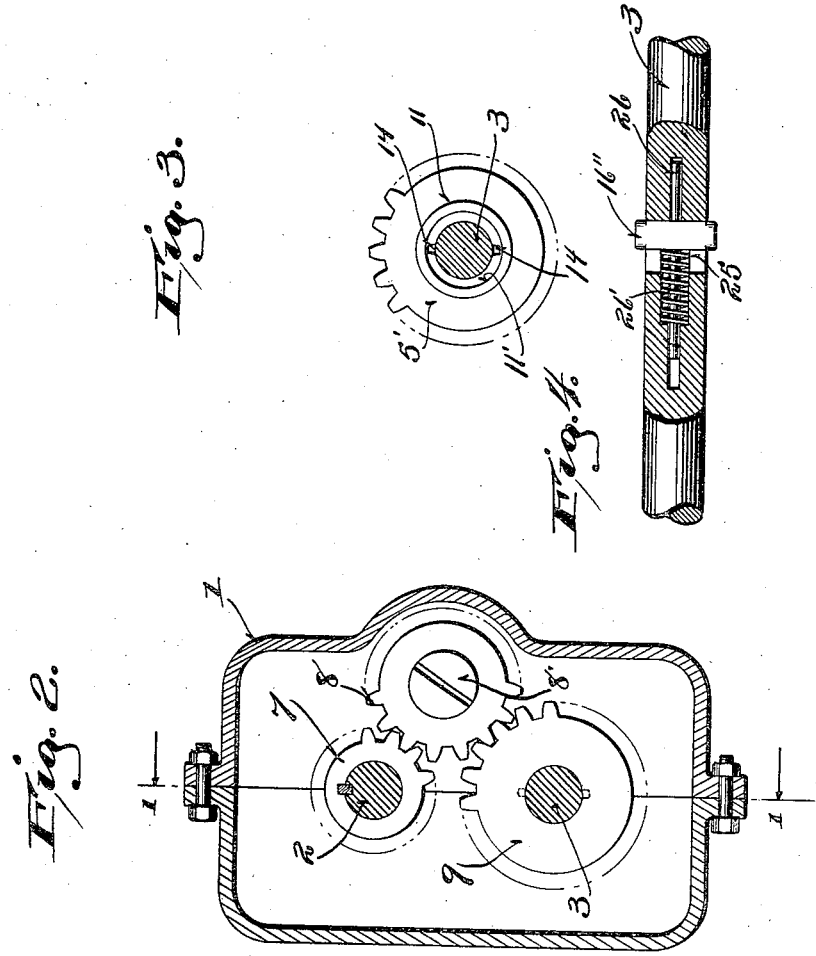

PETER ALVIN AMUNDSON, OF OCONOMOWOC, WISCONSIN, ASSIGNOR OF ONE-HALF TO THOMAS ANDREW AMUNDSON, OF OCONOMOWOC, WISCONSIN.

VARIABLE-SPEED GEAR.

1,422,072.   Specification of Letters Patent.   Patented July 11, 1922.

Application filed February 1, 1921. Serial No. 441,566.

*To all whom it may concern:*

Be it known that I, PETER ALVIN AMUNDSON, a citizen of the United States, and resident of Oconomowoc, in the county of Waukesha and State of Wisconsin, have invented certain new and useful Improvements in Variable-Speed Gears; and I do hereby declare that the following is a full, clear, and exact description thereof.

My invention refers to variable speed gear mechanism, and it has for its primary object to provide a simple, economical and positive means for selectively varying the forward speed and reverse without disconnecting the mesh gear train, by longitudinally shifting a key unit, whereby the gears are selectively locked in driving connection. Thus by this arrangement I have overcome the objectionable feature of the ordinary type of gear shift, wherein jamming or stripping of the gears frequently results. My invention also contemplates dispensing with the usual form of toothed clutches, which are used in certain types of speed gears, whereby complications in the shifts will result.

Another object of my invention is to provide companion shafts, one of which has rigidly secured thereto a series of gears, while the other shaft has a reverse series of gears loosely mounted thereon provided with hubs having circular recesses connected by key-ways, adapted to co-operate with a longitudinally, shiftable key for selectively varying the speed desired, in a step-by-step action, or whereby the key may be shifted to obtain a reverse drive through an idle gear connecting a companion gear set, it being understood that the companion gears are constantly in mesh.

With the above and other minor objects in view, the invention consists in certain peculiarities of construction and combination of parts, as are hereinafter set forth with reference to the accompanying drawings and subsequently claimed.

In the drawings:

Figure 1 represents a sectional elevation of a variable speed gear embodying the features of my invention, the section being indicated by line 1—1 of Figure 2.

Figure 2 is a cross section of the same, the section being indicated by line 2—2 of Figure 1.

Figure 3 is a detail cross section, particularly showing the hub arrangement of one of the loose gears, whereby the same is locked to its shaft, and Figure 4 is a detail cross section of a fragment of the driven shaft element showing a modified form of locking key.

Referring by characters to the drawings, 1 represents a gear housing provided with journals for a drive shaft 2, and a driven shaft 3, one of the bearings 1' of the driven shaft being offset from the body of the casing as shown in Figure 1. The drive shaft 1 has keyed or otherwise rigidly secured thereto a train of toothed gears 4, 5 and 6, which are progressively increased in diameter. Said shaft has also secured thereto a reverse drive gear wheel 7 which is meshed with an idle gear wheel 8 that is mounted on a stud 8' secured to one wall of the housing. The idle gear wheel 8, as best shown in Figure 2, is meshed with a gear wheel 9 that is loosely mounted upon the driven shaft 3, the same being held against end play between the juxtaposed wall of the housing and the face of the bearing 1'. Loosely mounted between the bearing 1' and the opposite inner face of the housing is a companion set of reverse, progressively, increasing in size, set of gear wheels 6', 5' 4', the smaller gear wheel 6' being meshed with the larger gear wheel 6, the intermediate gear wheel 5' being meshed with the intermediate gear wheel 5, and the larger diameter gear wheel 4' being meshed with the smallest gear wheel of the other series 4. The gear wheels 6' to 4' inclusive are each provided with hubs 10, 11 and 12, the end faces of which hubs are in abutting relations and are formed with internal recesses 10', 11' and 12'. Each of the hub recesses is intersected by one or more longitudinally disposed keyways 13, 14 and 15 respectively. The driven shaft 3 carries a key 16 at an intermediate point, which key, together with the shaft 3, is arranged to be moved longitudinally for selectively engaging the keyways of the gear wheels 4', 5' and 6'.

The shaft 3 is also provided near its end with a key 16', which key is adapted to engage a keyway 17 in the hub of the reverse drive gear wheel 9. This key 16, together with the shaft end, is arranged to travel longitudinally through an opening 1'' formed in the juxtaposed side wall of the casing. A circular recess 1''' is formed in the opposite inner wall of the housing for the reception of the key 11 when the driven shaft is shifted to its extreme position for reversed drive, in which position, as shown in Figure 1 of the drawings, the key 16' of the shaft is in locking engagement with the reverse gear wheel 9, and hence, the parts, as shown, are positioned to deliver a reversed drive from the main shaft 2 to the driven shaft 3.

It will be observed that the hub recesses of the loosely mounted series of gears together form housings or pockets for the reception of the key 16, whereby the key, when nested in any one of these series of pockets, will place the juxtaposed gears in neutral position and they are free to revolve idly upon the driven shaft 3.

As exemplifying one way of shifting the key or keys, Figure 1 illustrates a ring 18 which is loosely mounted between a pair of collars 19 that are secured to the shaft 3. The spanner ring 18 is provided with studs which are adapted to engage the slotted end 20 of a pivoted controlling lever 21, and the coupling end of the driven shaft is squared, as shown at 22, for slip drive connection with the end of a jack shaft 23. Thus it will be seen that the shaft 3 can be moved longitudinally by manually operating the lever 21, but it will always maintain a driving connection with reference to the jack shaft. A detent 24 is diametrically illustrated in connection with the lever 21, the said detent being provided with arbitrarily arranged symbols, whereby the operator can readily determine movement of the lever to obtain a predetermined speed of the driven shaft, or to determine the position of shifting said lever when it is desired to obtain a reversed drive.

From the foregoing description, it is obvious that when the parts are in position, as shown in Figure 1, should the operator desire to shift from reverse drive to low forward speed, he will move the lever as indicated by the detent from reverse to first. In effecting this movement, it will be noted that the key 16 will pass through the hub recess 12', and when the keyways 15 come into register with the key, the same can be slipped into first speed by entering said keyway, and thus locking the gear wheel 4'. It follows that should the operator desire to increase the speed of the drive, the lever is moved toward second speed and in traveling from "first to second," the gear wheel 4 is first released by the key and the mechanism is momentarily in a neutral position. A further movement of the key will cause it to lock the gear wheel 5', and this same movement is progressively effected to obtain third or high speed, in which case the gear wheel 6' is locked so as to impart rotation to the shaft 3 from the large gear wheel 6 carried by the main drive shaft 2. It will also be noted that just prior to the mechanism being thrown into forward first speed, the keyway 16 will disconnect the reverse drive wheel 9, so that the reverse speed becomes idle prior to locking the wheels for effecting the forward drive.

Obviously I may, without departing from the spirit of my invention, operate the keys step-by-step by various mechanical arrangements for effecting the desired result, as for example, the keys may be mounted upon a rod extending through a central bored aperture of the shaft 3, and this rod could be shifted without any longitudinal movement of the drive shaft.

Figure 4 illustrates a yieldable key 16'', associated with the shaft 3. In this form, the key extends through a slot 25 of the shaft and said key is mounted upon a plunger 26 which is journaled for longitudinal movement in a central aperture formed in the shaft. This aperture to one side of the key is counterbored for the reception of a coil spring 26', which is interposed between the face of the counter-bore and one wall of the key 16'. Hence, with this arrangement when it is desired to shift, for example, from neutral or reverse to first speed, the operator can shift the lever 21 directly from the point of reverse to first speed, and should the keyway not be in register with the key when this movement took place, the key 16' will abut the base of the hub recess 12' and be held under spring tension until such time as the keyway 15 comes in register with the key, whereby the spring will cause the key to effect instantaneous lock engagement. Thus it will be seen that the lever can be shifted the full movement and locked in this position, whereby the intermeshed gears will be automatically locked when the keyway comes into correct position.

While I have shown and described certain means for specifically carrying out my invention, it is understood that I may vary the structural features within a fair interpretation of the claim.

I claim:

A variable speed gear comprising a driven shaft, said driven shaft having a transverse recess and a central, longitudinal recess, a plurality of gears on the drive shaft, a longitudinal, continuous key for said gears rigid with said shaft, a plurality of gears on the driven shaft provided with circular recesses and longitudinal slots, a key on said driven shaft reciprocable in said transverse recess, a plunger rigid with said key mounted in said longitudinal recess, and a spring urging said key rearwardly in said transverse recess, said key extending from said driven shaft so as to engage with the longitudinal slot of each gear selectively, a reverse gear on said driven shaft provided with a slot, a key on said driven shaft for engaging in said slot, a stud, a gear wheel on said stud meshing with said reverse gear and one of said gears on said driven shaft.

In testimony that I claim the foregoing I have hereunto set my hand at Milwaukee, in the county of Milwaukee and State of Wisconsin.

PETER ALVIN AMUNDSON.